US009479586B2

(12) United States Patent
Castrogiovanni et al.

(10) Patent No.: US 9,479,586 B2
(45) Date of Patent: Oct. 25, 2016

(54) DISTRIBUTED SYSTEM FOR STORING DIGITAL DATA

(75) Inventors: Pino Castrogiovanni, Turin (IT); Giovanni Malnati, Turin (IT); Giovanni Martini, Turin (IT)

(73) Assignee: Telecom Italia S.p.A., Milan (IT)

( * ) Notice: Subject to any disclaimer, the term of this patent is extended or adjusted under 35 U.S.C. 154(b) by 820 days.

(21) Appl. No.: 13/254,900

(22) PCT Filed: Mar. 5, 2009

(86) PCT No.: PCT/EP2009/052610
§ 371 (c)(1),
(2), (4) Date: Sep. 6, 2011

(87) PCT Pub. No.: WO2010/099827
PCT Pub. Date: Sep. 10, 2010

(65) Prior Publication Data
US 2011/0314135 A1    Dec. 22, 2011

(51) Int. Cl.
*G06F 15/16* (2006.01)
*H04L 29/08* (2006.01)
(Continued)

(52) U.S. Cl.
CPC ..... *H04L 67/1097* (2013.01); *G06F 17/30197* (2013.01); *H04L 29/06* (2013.01); *H04L 67/1014* (2013.01); *H04W 12/08* (2013.01); *H04L 63/101* (2013.01); *H04L 67/1002* (2013.01)

(58) Field of Classification Search
CPC ......................... H04L 29/06; H04L 29/08072
USPC ............... 709/206, 220, 228, 224, 225, 246; 713/201
See application file for complete search history.

(56) References Cited

U.S. PATENT DOCUMENTS 7,091,225 B2 *    8/2006    Sierra ................. C07D 277/26
                                                   514/365
7,228,339 B2 *    6/2007    Yamamoto ............ G06F 3/1203
                                                   358/1.13
(Continued)

FOREIGN PATENT DOCUMENTS

DE    10 2006 022421 A1    11/2007
WO    2008/081121 A2    7/2008

OTHER PUBLICATIONS

International Search Report mailed Feb. 9, 2010, PCT/EP2009/052610.

*Primary Examiner* — Khanh Dinh
(74) *Attorney, Agent, or Firm* — Banner & Witcoff, Ltd.

(57) ABSTRACT

A distributed system for storing digital data is disclosed. The distributed system includes a portable storage device suitable for being connected to a terminal, at least one storage server and a dispatching server. The dispatching server is suitable for retrieving accessibility information indicating that the at least one storage server is accessible by the portable storage device. The portable storage device is suitable for, when connected to the terminal, sending identification information to the dispatching server. The dispatching server is suitable for, upon reception of the identification information, using the identification information for retrieving the accessibility information and for sending the accessibility information to the portable storage device. The portable storage device is suitable for, upon reception of the accessibility information from the dispatching server, using the accessibility information for establishing a connection with the at least one storage server and for allowing the terminal to access it.

17 Claims, 4 Drawing Sheets

(51) Int. Cl.
*H04L 29/06* (2006.01)
*G06F 17/30* (2006.01)
*H04W 12/08* (2009.01)

(56) References Cited

U.S. PATENT DOCUMENTS

| | | | | |
|---|---|---|---|---|
| 7,650,419 | B2 * | 1/2010 | Curtis | G07F 17/16 709/229 |
| 8,443,056 | B2 * | 5/2013 | Hunt | 709/219 |
| 8,463,936 | B2 * | 6/2013 | Maze | G06F 17/30206 709/238 |
| 8,468,244 | B2 * | 6/2013 | Redlich | G06Q 10/06 705/50 |
| 8,893,195 | B2 * | 11/2014 | Denny | G06F 21/6218 725/62 |
| 2002/0188871 | A1 * | 12/2002 | Noehring et al. | 713/201 |
| 2004/0104842 | A1 * | 6/2004 | Drury et al. | 342/357.13 |
| 2006/0010325 | A1 | 1/2006 | Liu et al. | |
| 2007/0294457 | A1 | 12/2007 | Gantman et al. | |
| 2008/0148358 | A1 * | 6/2008 | Denny | G06F 21/10 726/4 |
| 2009/0132676 | A1 * | 5/2009 | Tu et al. | 709/217 |
| 2009/0222455 | A1 | 9/2009 | Molinie et al. | |
| 2010/0293383 | A1 * | 11/2010 | Coughlin et al. | 713/176 |
| 2011/0185041 | A1 * | 7/2011 | Hunt | 709/219 |

* cited by examiner

DISTRIBUTED SYSTEM FOR STORING DIGITAL DATA

CROSS REFERENCE TO RELATED APPLICATIONS

This is a U.S. National Phase Application under 35 U.S.C. §371 of International Application No. PCT/EP2009/052610, filed Mar. 5, 2009, which was published Under PCT Article 21(2), the entire contents of which are incorporated herein by reference.

TECHNICAL FIELD

The present invention relates to the field of digital data storing. In particular, the present invention relates to a distributed system for storing digital data.

BACKGROUND ART

Portable storage devices for storing digital data are known in the art. A portable storage device typically comprises a memory and an interface through which the portable storage device can be releasably plugged in a terminal, such as for instance a PC, a mobile phone, a digital photo-frame, a set-top box, etc.

A very common type of portable storage device is the so-called "USB drive", which typically includes a non volatile memory (e.g. a flash memory of NAND type) and a USB ("Universal Serial Bus") interface. Storage capacity of a USB drive typically ranges from 64 MB to 64 GB and more, and may allow up to 1 million re-writing cycles.

When a portable storage device is plugged in a terminal, the terminal typically presents the content of the portable storage device as a file system additional to its local one. Accordingly, the user may access and possibly modify the content of the portable storage device, as if such content were stored in a local memory of the terminal. For instance, if the portable storage device stores audio files, the user may listen to them by suitable audio output means (e.g. a speaker) of the terminal. On the other hand, if the portable storage device stores image files, the user may view them by using suitable output means (e.g. a screen) of the terminal. On the other hand, if the portable storage device stores text files, the user may read and modify them by using suitable output means (e.g. a screen) and input means (e.g. a keyboard or a mouse) of the terminal.

US 2007/0294457 discloses a USB device that includes a USB interface and mimics the operation of a typical USB drive. The USB device provides identification information through its USB interface indicating that it is a storage device. In reality, the USB device does not include a USB drive or storage but rather a communication interface, such as a wired or wireless network interface, that allows the USB device to autonomously connect to and/or map a networked drive. This allows the USB device to establish a communication link to a remote storage device over the communication interface. Thus, the USB device allows a terminal to transparently connect to a remote network drive via a USB port, while the remote network drive appears as a local USB drive to the terminal.

SUMMARY OF THE INVENTION

The Applicant has perceived that the USB device of US 2007/0294457 has some drawbacks.

Indeed, the USB device of US 2007/0294457 is configured to set up a connection with one or more storage drives included in a storage server. Connections are automatically set up by the USB device when it is plugged in a terminal (e.g. a PC).

Therefore, in case the USB device is lost or stolen, unauthorized parties may disadvantageously access the content of the storage server by using the USB device. Indeed, a third party taking possession of the USB device merely has to plug the USB device in a terminal, and the USB device automatically establishes the connection to the storage server and accesses its content, without requiring any other operation by the third party.

Moreover, automatic set up of the connection between the USB device and the storage server disadvantageously prevents the user from selecting the storage drives towards which the USB device must set up a connection, and from dynamically changing his/her selection while she/he is using the USB device. This disadvantageously limits the types of communication services that may be offered to the user by means of the USB device.

Indeed, the Applicant has perceived that, if the user were provided with the capability of selecting one or more storage servers towards which a portable storage device (such as a USB drive) must set up a connection, and dynamically changing his/her selection while she/he is using the portable storage device, she/he could access a wide variety of communication services by using the portable memory device. For instance, the user may plug the portable storage device in the car radio of her/his car, and then decide whether to use the portable storage device for accessing mp3 files stored e.g. in the hard disk of her/his home PC (acting as a first storage server) or use the portable storage device for purchasing new mp3 files from a service provider server (acting as a second media server). This is merely an example.

In view of the above, the Applicant has tackled the problem of providing a distributed system for storing digital data, the distributed system including a portable storage device and a number of storage servers, that overcomes the aforesaid drawbacks.

In particular, the Applicant has tackled the problem of providing a distributed system for storing digital data, the distributed system including a portable storage device and a number of storage servers, that allows the user to manage authorizations to access the storage servers so that, in case the portable storage device is lost or stolen, she/he can prevent third parties from accessing the media servers by using the lost or stolen portable storage device.

Further, the Applicant has tackled the problem of providing a distributed system for storing digital data, the distributed system including a portable storage device and a number of storage servers, that allows the user to select the storage server(s) towards which the portable storage device must set up a connection, and to dynamically change his/her selection while she/he is using the portable storage device.

According to a first aspect, the present invention provides a distributed system for storing digital data, the distributed system comprising a portable storage device suitable for being connected to a terminal, at least one storage server and a dispatching server suitable for communicating with the portable storage device and with the at least one storage server, wherein:

the dispatching server is suitable for retrieving accessibility information indicating that the at least one storage server is accessible by the portable storage device;

the portable storage device is suitable for, when connected to the terminal, sending identification information to the dispatching server;

the dispatching server is further suitable for, upon reception of the identification information, using the identification information for retrieving the accessibility information and for sending the accessibility information to the portable storage device; and the portable storage device is suitable for, upon reception of the accessibility information from the dispatching server, using the accessibility information for establishing a connection with the at least one storage server and for allowing the terminal (2) to access the at least one storage server.

Preferably, the portable storage device comprises:

an interface suitable for allowing the portable storage device to be connected to the terminal;

a memory suitable for locally storing digital data at the portable storage device;

a wireless module suitable for allowing the portable storage device to be connected to the at least one storage server; and a controller including one or more software programs and a microprocessor suitable for executing the one or more software programs, the controller being suitable for acquiring information from the interface and/or the memory and/or the wireless module and controlling their operation according to the accessibility information received from the dispatching server.

Preferably, the portable storage device is configured to send the identification information to the dispatching server by means of a further connection established through the wireless module.

Preferably, the terminal accesses the at least one storage server for sending and/or receiving digital data.

Preferably, the portable storage device further comprises an input/output module suitable for allowing the user to acquire at least part of the accessibility information from the portable storage device and to impart the commands to the portable storage device.

Preferably, the portable storage device is configured to allow access to digital data stored in the memory and digital data stored at the at least one storage server as a single file system.

Preferably, the portable storage device is configured to, in case the accessibility information indicate that more than one storage server is accessible by the portable storage device, automatically connect to a default storage server of the more than one storage server.

Preferably, the portable storage device is configured to, in case more than one storage server is accessible by the portable storage device:

present the user with a list of the more than one storage server;

receive from the user a command indicating a selected storage server among the more than one storage server; and connect to the selected storage server.

Preferably, the portable storage device is configured to, after establishing the connection with the at least one storage server:

receive from the user a command to access another storage server;

activate a new connection towards the another storage server; and perform a reboot of the portable storage device, thereby presenting the user with digital data stored at the another storage server.

Preferably, the portable storage device is configured to deactivate the connection towards the at least one storage server, before activating the new connection towards the another storage server.

Preferably, the dispatching server is suitable for receiving the accessibility information from the at least one storage server.

Profitably, the dispatching server is suitable for receiving and storing updates of the accessibility information, and to send the updates to the portable storage device.

Preferably, the at least one storage server is configured to execute a remote access function suitable for interacting with the dispatching server, the remote access function allowing at least part of digital data stored at the storage server to be accessed by the portable storage device.

Preferably, the distributed system comprises a further portable storage device coupled to the portable storage device, the further portable storage device comprising:

a further interface suitable for allowing the further portable storage device to be connected to the storage server; and a further memory suitable for locally storing identification information matching the identification information sent by the portable storage device to the dispatching server.

Preferably, the distributed system further comprises a billing system, the dispatching server being configured to, upon reception of the identification information from the portable storage device, cooperate with the billing system for determining whether the user may access the at least one storage server by means of the portable storage device.

According to a second aspect, the present invention provides a method for presenting a user with digital data stored in at least one storage server by means of a portable storage device suitable for being connected to a terminal, the method comprising:

providing, at a dispatching server suitable for communicating with the portable storage device and the at least one storage server, accessibility information indicating that the at least one storage server is accessible by the portable storage device;

connecting the portable storage device to the terminal and sending identification information from the portable storage device to the dispatching server;

at the dispatching server, using the identification information for retrieving the accessibility information and sending the accessibility information to the portable storage device; and at the portable storage device, using the accessibility information for establishing a connection with the at least one storage server and for allowing the terminal to access the at least one storage server through the terminal.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
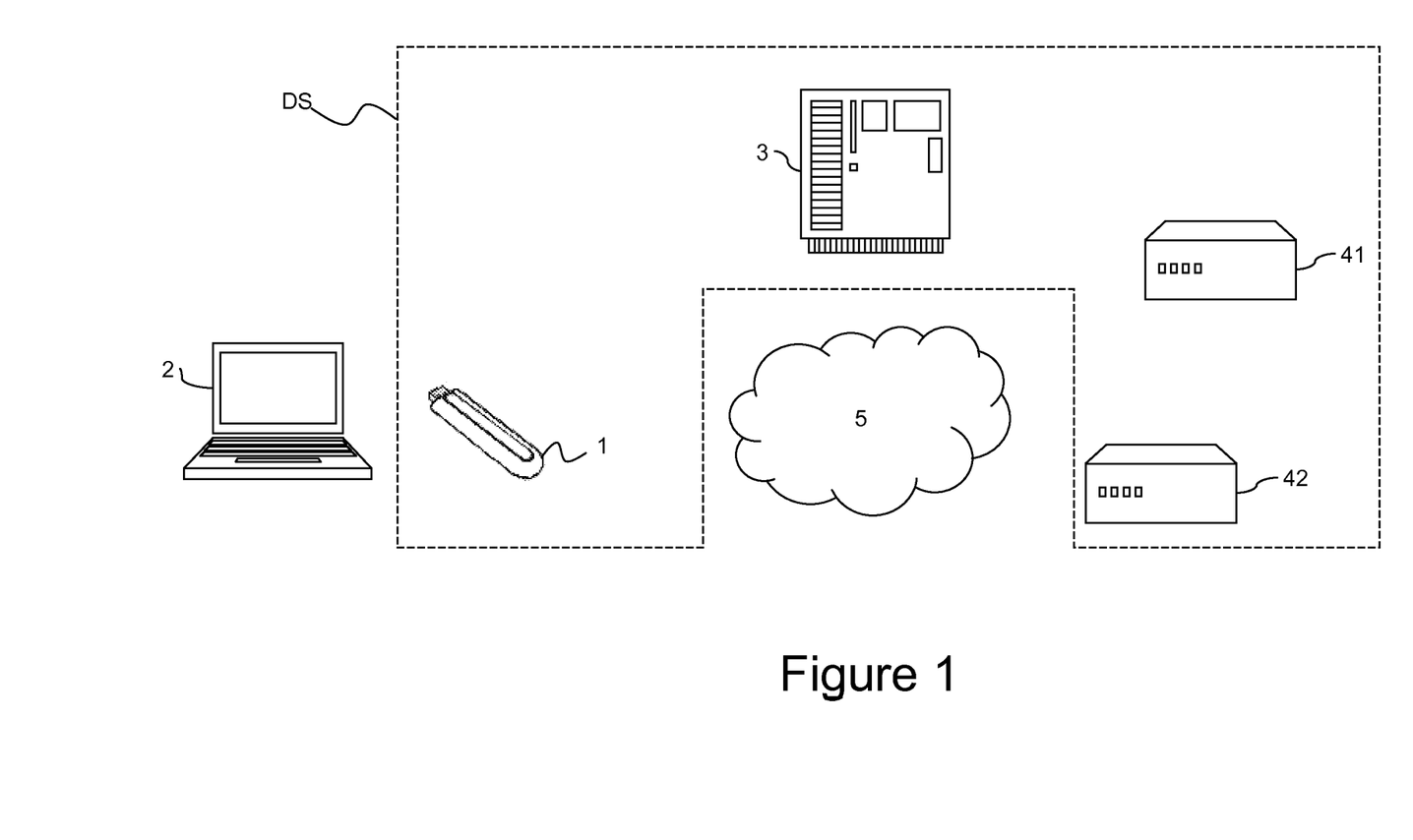
FIG. 1 schematically shows a distributed system for storing digital data, according to an embodiment of the present invention.

FIG. 1 schematically shows a distributed system DS for storing digital data according to an embodiment of the present invention.

The distributed system DS comprises a portable storage device 1, a dispatching server 3, and a number of storage servers. By way of mere example, the number of storage servers is assumed equal to two, i.e. the distributed system DS comprises two storage servers 41, 42. The distributed system DS is suitable for cooperating with a terminal 2 and with a communication network 5, as it will be disclosed in further detail herein after.

Figure 2:
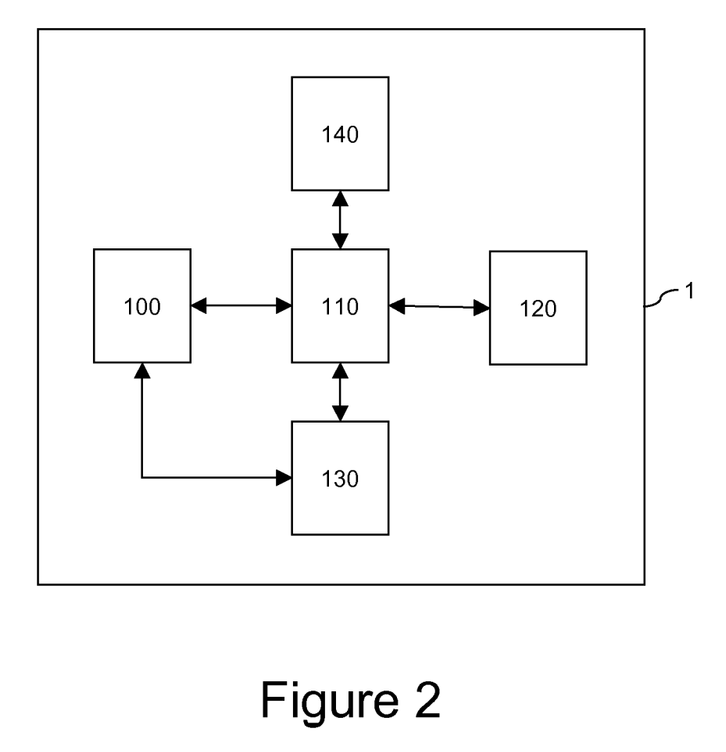
FIG. 2 schematically shows the structure of the portable storage device of FIG. 1, according to an embodiment of the present invention.

The structure of the portable storage device 1 according to an embodiment of the present invention is shown in FIG. 2. The portable storage device 1 preferably comprises an interface 100 allowing the portable storage device 1 to be connected to the terminal 2. When the portable storage device 1 is connected to the terminal 2, the device 1 presents data organised in one or more file systems, as explained in detail herein after. A file system is in general a system for storing and organizing computer files and the data they contain to make it easy to find and access them. Examples of file systems are FAT (File Allocation Table) or NTFS (New Technology File System). The interface 100 may be either a wired interface or a wireless interface. For instance, such an interface 100 may be a USB interface or a Compact Flash interface or a SD interface. Alternatively, the interface 100 may be a Wi-Fi interface or a Bluetooth interface or, in general, a short range wireless interface. Besides, the portable storage device 1 preferably comprises a memory 130 allowing the portable memory device 1 to locally store digital data. Preferably, such a memory 130 is a non volatile memory, such as for instance a flash memory of NAND type. The interface 100 and the memory 130 are preferably connected to each other, as shown in FIG. 2.

Besides, according to embodiments of the present invention, the portable storage device 1 comprises a wireless module 120, allowing the portable memory device 1 to be connected to the dispatching server 3 and/or to the storage servers 41, 42 through the communication network 5. For instance, the wireless module 120 may be based on Wi-Fi, WiMax, Bluetooth, GPRS ("General Packet Radio Service"), UMTS ("Universal Mobile Telecommunications System"), HSDPA ("High-Speed Downlink Packet Access") and so on. Besides, the portable storage device 1 preferably comprises an input/output module 140, allowing a user of the terminal 2 to acquire information directly from the portable storage device 1 and to impart commands directly to the portable storage device 1, as it will described in detail herein after. For instance, the input/output module 140 may comprise, as input means, one or more buttons, a finger-sensitive area, a microphone, etc. On the other hand, for instance, the input/output module 140 may comprise, as output means, one or more LEDs, a display, a speaker, etc. The portable storage device 1 further comprises a controller 110. The controller 110 preferably includes one or more software programs and a microprocessor suitable for executing the one or more software programs. The controller 110 is preferably connected to all the other components of the portable storage device 1 (i.e. the interface 100, the memory 130, the wireless module 120 and the input/output module 140), as shown in FIG. 2. The controller 110 is suitable for, when its microprocessor executes the one or more software programs, acquiring information from the other components of the portable storage device 1 and controlling their operation according to information received from the dispatching server 3 and according to information input by the user either through the terminal 2 or through the input/output module 140 of the portable storage device 1, as it will be disclosed in further detail herein after.

Referring again to FIG. 1, the storage servers 41, 42 are electronic devices including respective memories suitable for storing digital data and/or generating them, such as for instance: PCs, mobile phones, set-top boxes, etc. For instance, according to an exemplary scenario, the storage server 41 may be the mobile phone of the user, and the storage server 42 may be a database of a service provider offering premium contents, e.g. clips or movies. Each of the storage servers 41, 42 is preferably provided with a communication module (not shown in FIG. 1) allowing it to be connected to the portable storage device 1 and to the dispatching server 3 through the communication network 5. Such a communication module may be either a wireless module (e.g. Wi-Fi) or a wired module (e.g. Ethernet). Preferably, each of the storage servers 41, 42 comprises a respective controller (not shown in FIG. 1) suitable for implementing a respective remote access function allowing it to interact with the dispatching server 3 and with the portable storage device 1, as it will be described in further detail herein after. Preferably, the remote access functions allow the user to configure the storage servers 41, 42 in order to make their contents fully or partially accessible by the portable storage device 1. According to an alternative scenario, the storage servers 41, 42 may act as intermediate servers allowing remote access to digital data stored at further storage servers (not shown in FIG. 1 for sake of simplicity) connected to the storage servers 41, 42 through the communication network 5 or another communication network (e.g. a home wireless/wired LAN) and supporting content sharing capabilities, e.g. by means of the DLNA standard (Digital Living Network Alliance). In this case, the further storage servers support the DLNA media server profile, and the storage server 41, 42 are their respective clients). As an example, such further storage servers could comprise also mobile phones, mobile internet devices supporting the DLNA media server profile.

The dispatching server 3 is also provided with a communication module (not shown in FIG. 1) allowing it to be connected to the portable storage device 1 and to the storage servers 41, 42 through the communication network 5. The role of the dispatching server 3 will be described in detail herein after.

The terminal 2 is preferably provided with an interface (not shown in FIG. 1) suitable for allowing the portable storage device 1 to be connected to the terminal 2. For instance, the terminal 2 may be a PC, a mobile phone, a digital photo-frame, a set-top box, a car radio, etc.

The communication network 5 may include one or more circuit-switched networks (such as e.g. SDH networks or Sonet networks) and/or one or more packet-switched networks (such as e.g. Ethernet network, Internet network, ATM networks, etc.). The communication network 5 may be a wired network, a wireless network, or a mix of wired and wireless networks.

Figure 3:
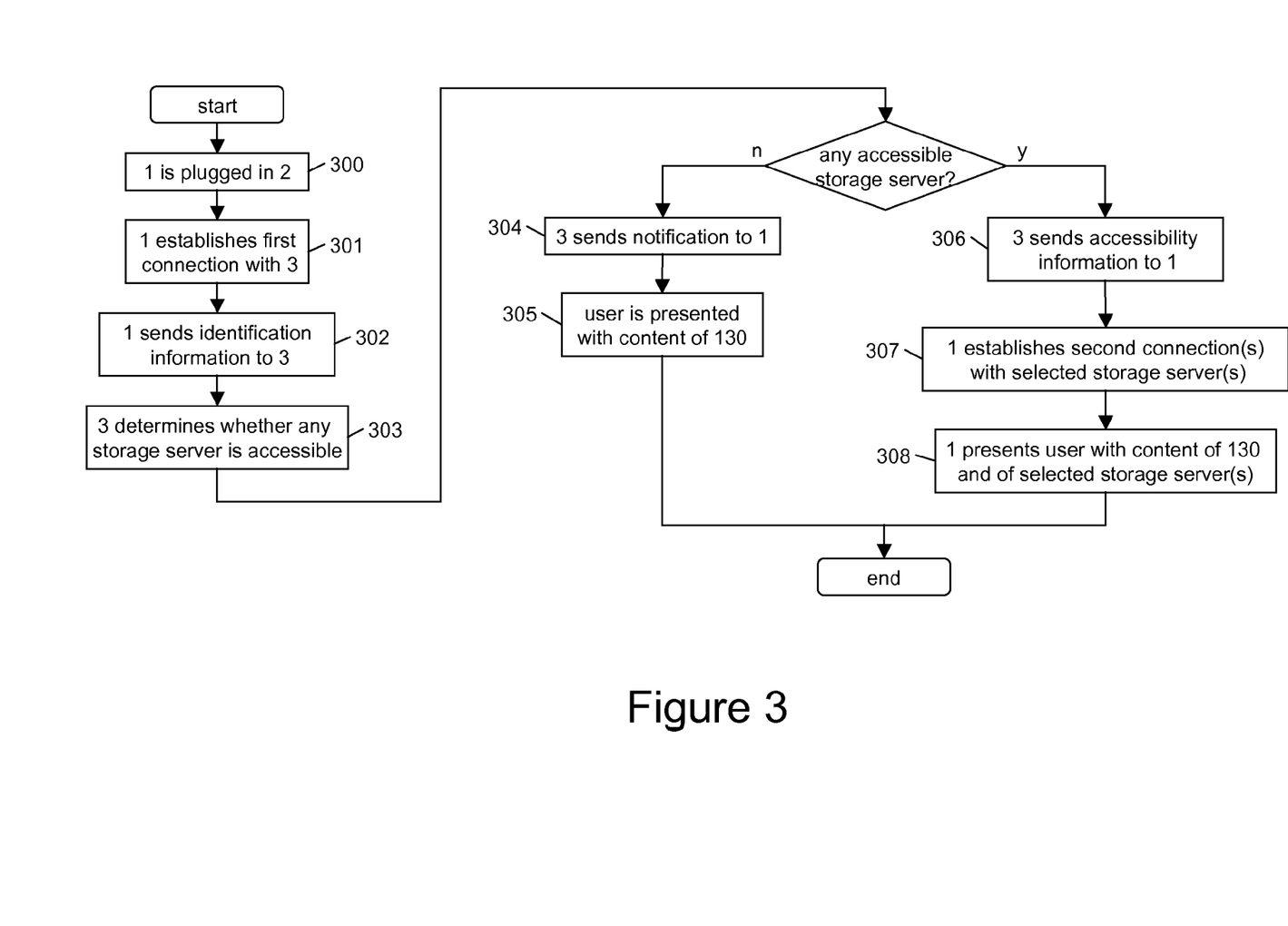
FIG. 3 is a flow chart of the operation of the distributed system shown in FIG. 1, according to an embodiment of the present invention.

By referring to the flow chart of FIG. 3, the operation of the distributed system DS of FIG. 1 will be now described in detail, according to an embodiment of the present invention.

When the user of the terminal 2 connects the portable storage device 1 to the terminal 2 (step 300), the controller 110 of the portable storage device 1 turns on, and then establishes a first connection with the dispatching server 3 through the wireless module 120 and the communication network 5 (step 301). The procedure for establishing the first connection mainly depends on the technology on which the wireless module 120 is based. Preferably, the first connection is a secure connection, whose activation provides use of a password, or key or equivalent secret data stored at the portable storage device 1.

Then, after the first connection is established, the controller 110 preferably sends identification information to the dispatching server 3 through the first connection (step 302). Preferably, the identification information comprise an identifier of the portable storage device 1 (allowing the dispatching server 3 to uniquely identify the portable storage device 1) and, possibly, its address (e.g. the MAC address of the wireless module 120 and/or network address, e.g. IP address). According to advantageous variants, instead of establishing the first connection and sending the identification information through the first connection, the identification information may be sent by the portable storage device 1 to the dispatching server 3 by means of SMS.

Upon reception of the identification information, the dispatching server 3 preferably uses such identification information for determining whether any of the storage servers 41, 42 is accessible by the portable storage device 1 (step 303). To this purpose, the dispatching server 3 preferably receives from the storage servers 41, 42 accessibility information about their accessibility by the portable storage device 1. In particular, when anyone of the storage servers 41, 42 becomes accessible by the portable storage device 1, it preferably sends to the dispatching server 3 accessibility information comprising its identifier and an address towards which a connection has to be activated for accessing it (e.g. its IP address). Upon reception of the accessibility information, the dispatching server 3 preferably stores them in a database cooperating with it. Alternatively, the dispatching server 3 may be configured with accessibility information by a service provider that, for instance, manages storage servers with premium contents.

When, during step 302, the dispatching server 3 receives identification information from the portable storage device 1, it performs step 303 by looking up its database and determining whether it stores accessibility information indicating that a storage server is accessible by the portable storage device 1.

In case none of the storage servers 41, 42 is accessible by the portable storage device 1, during step 303 the dispatching server 3 does not find any accessibility information in its database. Accordingly, it preferably sends a notification to the portable storage device 1, informing it that there are no accessible storage servers (step 304). Such a situation may occur for instance when the storage servers 41, 42 are actually inaccessible (e.g. they are switched-off, they are failed, the communication network 5 is failed, etc.), or when the dispatching server 3 is forced to consider the storage servers 41, 42 as inaccessible.

This last option advantageously allows a user, whose portable storage device is lost or stolen, to prevent unauthorized parties from fraudulently accessing the content of the storage servers 41, 42 by using her/his portable storage device. In this situation, indeed, the user may inform the service provider responsible of managing the dispatching server 3 that the portable storage device 1 is lost or stolen, and that accordingly accessibility of the storage servers 41, 42 by the portable storage device 1 should be prevented. The service provider may then force the dispatching server 3 to, upon reception of identification information from the portable storage device 1, automatically determine that none of the storage servers 41, 42 is accessible (independently of the accessibility information possibly stored in its database) and perform step 304. Advantageously, in one embodiment the user can send a SMS with the identification information of his/her storage device to the dispatching server 3, in order to inhibit access (which access may be restored later). Alternatively, the user may inhibit access by using an ad-hoc application or web application.

Advantageously, this procedure is very simple, since access by the portable storage device 1 to the storage servers 41, 42 is mediated by the dispatching server 3. Indeed, if the portable storage device 1 were able to directly access the storage servers 41, 42, in case of loss or theft of the portable storage device 1, the operation of preventing access to the storage servers 41, 42 by the portable storage device 1 would be much more complicated. Indeed, if for instance the storage servers 41, 42 are property of the user (i.e. they are her/his PC, mobile phone, etc.), the user should manually disable the remote access function at each storage server. This operation is much complicated than the one described above, and moreover is hazardous, since the user may forget to deactivate the remote access function on one or more of the storage servers. Using the dispatching server 3 is therefore advantageous in case the user wishes to block access to previously accessible storage servers.

Referring again to FIG. 3, upon reception of the notification from the dispatching server 3, the controller 110 of the portable storage device 1 preferably operates the memory 130 and the interface 100 so that only the content of the memory 130 is accessed by the terminal 2 for being presented to the user (step 305). Optionally, during step 305 the controller 110 may also operate the input/output module 140 so that it generates an alarm (i.e. switching on of a LED) informing the user that the content she/he will be presented by the terminal 2 is completely stored locally at the portable storing device 1.

In case at least one of the storage servers 41, 42 is accessible by the portable storage device 1, during step 303 the dispatching server 3 finds the corresponding accessibility information in its database. Accordingly, it preferably sends such accessibility information to the portable storage device 1 (step 306).

Upon reception of the accessibility information at the portable storage device 1, the controller 110 preferably establishes one or more second connections with one or more of the accessible storage servers through the wireless module 120 and the communication network 5 (step 307). The procedure for establishing the second connection(s) again depends on the technology on which the wireless module 120 is based. For instance, during step 307, a second connection may be activated towards the first accessible storage server of the list of accessible storage servers. Alternatively, during step 307, a second connection may be activated towards the storage server(s) to which the portable storage device 1 was connected at the end of the previous session.

According to particularly advantageous variants of the present invention, upon reception of the accessibility information during step 306, before activating the second connection(s), the controller 110 may instruct the input/output module 140 to present the user with at least part of the accessibility information. For instance, if the input/output module 140 comprises a display, the controller 110 may operate the display so that it shows only the identifier(s) (and not also the addresses) of the accessible storage server(s). For instance, in case both the storage servers 41, 42 are accessible by the portable storage device 1, the display may show the identifiers of the storage servers 41, 42. Preferably, the user then selects, among the accessible storage servers, one or more storage servers to be actually accessed by means of the portable storage device 1. The user may perform such selection by using the input means of the input/output module 140, e.g. by suitably operating one or more buttons or a finger-sensitive area positioned on the case of the portable storage device 1. Alternatively, the user may perform the selection by means of the terminal 2 (for instance, by means of one or more SMS sent to the dispatcher 3, which then forward such command to the portable storage device 1—or SMS sent directly to the mobile identifier of portable storage device 1 if enabled by the network).

Upon selection by the user, during step 307 the controller 110 preferably establishes one or more second connections with the selected storage server(s) through the wireless module 120 and the communication network 5.

Therefore, advantageously, according to such advantageous variant, connection with the storage server(s) is performed only after the user has selected the accessible storage server(s) to which she/he actually wishes to access by means of her/his portable storage device 1. Indeed, before establishment of the second connection(s), the dispatching server 3 informs the user about storage server(s) declaring their accessibility by the portable storage device 1. Therefore, the dispatching server 3, collecting accessibility information from storage servers on one hand, and receiving identification information from the portable storage device on the other hand, mediate the connection between portable storage device and storage server(s), thus preventing the portable storage device from automatically connecting to all accessible storage servers as soon as it is plugged in the terminal 2, and providing an intermediate step during which the user may perform a selection of the storage servers to be accessed.

Upon establishment of the second connection(s), the controller 110 of the portable storage device 1 preferably operates the portable storage device 1 so that both the content of the memory 130 and the content of the selected storage server(s) is accessed by the terminal 2 for being presented to the user (step 308). The user may then perform various actions on such content. For instance, in case such content comprises audio file, the user may listen to such audio files. Besides, in case such content comprises text files, the user may read and/or modify such text files. The user may also add new files to the content of the selected storage server(s). In other words, the user may use the selected storage server(s) (or, at least, the memories areas thereof that are remotely accessible by the portable storage device 1) as if they were local drives of the terminal 2.

Preferably, during step 308 the content of the memory 130 and the content of the accessed storage server(s) may be presented in different ways. For instance, if the terminal 2 is capable of supporting multiple storage devices (such as for instance a PC), the content of the memory 130 and the content of each selected accessible storage server may be presented as separate file systems. On the other hand, if the terminal 2 is capable of supporting a single storage device (such as for instance a mobile phone), the content of the memory 130 and the content of the selected accessible storage server(s) are presented as a single file system, each content being represented as a single branch of such file system.

It is assumed now that, during step 303, the dispatching server has determined that both the storage servers 41, 42 are accessible by the portable storage device 1, and that during step 307 the portable storage device 1 has automatically established a second connection towards the storage server 41. It is now assumed that, while accessing the content of the storage server 41 (e.g. the user is listening to mp3 files stored in the storage server 41), the user decides to stop accessing the content of the storage server 41 and start accessing the content of the storage server 42 (i.e. the user wishes to download a new mp3 file from a server—i.e. the storage server 42—of a content provider).

According to advantageous embodiments of the present invention, in this situation the user may operate the input means (e.g. the button(s) or the finger-sensitive area) of the input/output module 140 to change her/his selection. The controller 110 then preferably terminates the second connection towards the storage server 41 and establish a new second connection towards the storage server 42. Then, preferably, a reboot of the portable storage device 1 may be forced, for refreshing the contents presented to the user by means of the terminal 2.

According to further advantageous embodiments, a reboot of the portable storage device 1 may also be forced by a storage server connected to the portable storage device (e.g. the second storage server 42 after the new second connection has been established), when an update of its content occurs. This advantageously allows the contents presented to the user by the terminal 2 to be automatically refreshed, each time the content of one of the storage server accessed by the portable storage device 1 is updated.

According to further advantageous embodiments, the dispatching server 3 is configured to transmit to the portable storage device 1 possible updates of the accessibility information received after the portable storage device 1 has already established one or more second connections towards one or more accessible storage server(s). In particular, according to such further advantageous embodiments, it may be assumed that, during step 303, the dispatcher server 3 determines that only the storage server 41 is accessible. The dispatcher server 3 then stores the corresponding accessibility information in its database and, upon reception of the identification information from the portable storage device 1, transmits them to the portable storage device 1. The portable storage device 1 then establishes a second connection towards the storage server 41, thereby being presented both with the content of the memory 130 and with the content of the storage server 41 (either in the form of separate file systems or in the form of a single file system as explained above). It is now assumed that the storage server 42 also becomes accessible by the portable storage device 1 and that, accordingly, sends the corresponding accessibility information to the dispatching server 3. Preferably, the dispatching server 3 stores such corresponding accessibility information in its database, and then preferably transmits it to the portable storage device 1. Such updated accessibility information may be transmitted e.g. in the form of SMS, or by means of the first connection established during step 301. The portable storage device 1 may then present the user (through the input/output module 140) with updated accessibility information indicating that both storage servers 41, 42 are now accessible. The user may then decide to change her/his selection, according to what explained above.

According to other embodiments, instead of waiting for possible updates of the accessibility information from the dispatcher server 3, the portable storage device 1 may be configured to periodically ask the dispatch server 3 whether updates of the accessibility information have been received from the storage servers.

Advantageously, the above disclosed distributed system for storing digital data may be used for providing the user with premium contents. In this case, preferably the dispatching server 3 is suitable for cooperating with a billing system. When the user purchases a premium content stored on a storage server of the content provider, the dispatching server 3 preferably sends to the billing system information indicating that the user has already paid for such a premium content, and therefore may freely access it each time she/he wishes to do so. Accordingly, when the user requests to access a content of a personal storage server (i.e. her/his mobile phone), the connection between her/his portable storage device 1 and the storage server is established without requiring intervention of the billing system. However, when the user requests the access to a premium content stored on a storage server of the service provider, before establishing the connection between the portable storage device 1 and the storage server, the billing system is checked in order to determine whether the user has already paid for that premium content. This is just an example of a possible billing scheme. Alternatively, access to contents and billing may be based on a time base, for example billing once a month for access to any content. According to particular preferred embodiments, the portable storage device 1 is also suitable for cooperating with the billing system through the dispatching server 3, for allowing the user to check the billing information stored in the billing system and possibly modify it (e.g., modify her/his preferences) by means of the input-output module 140.

Figure 4:
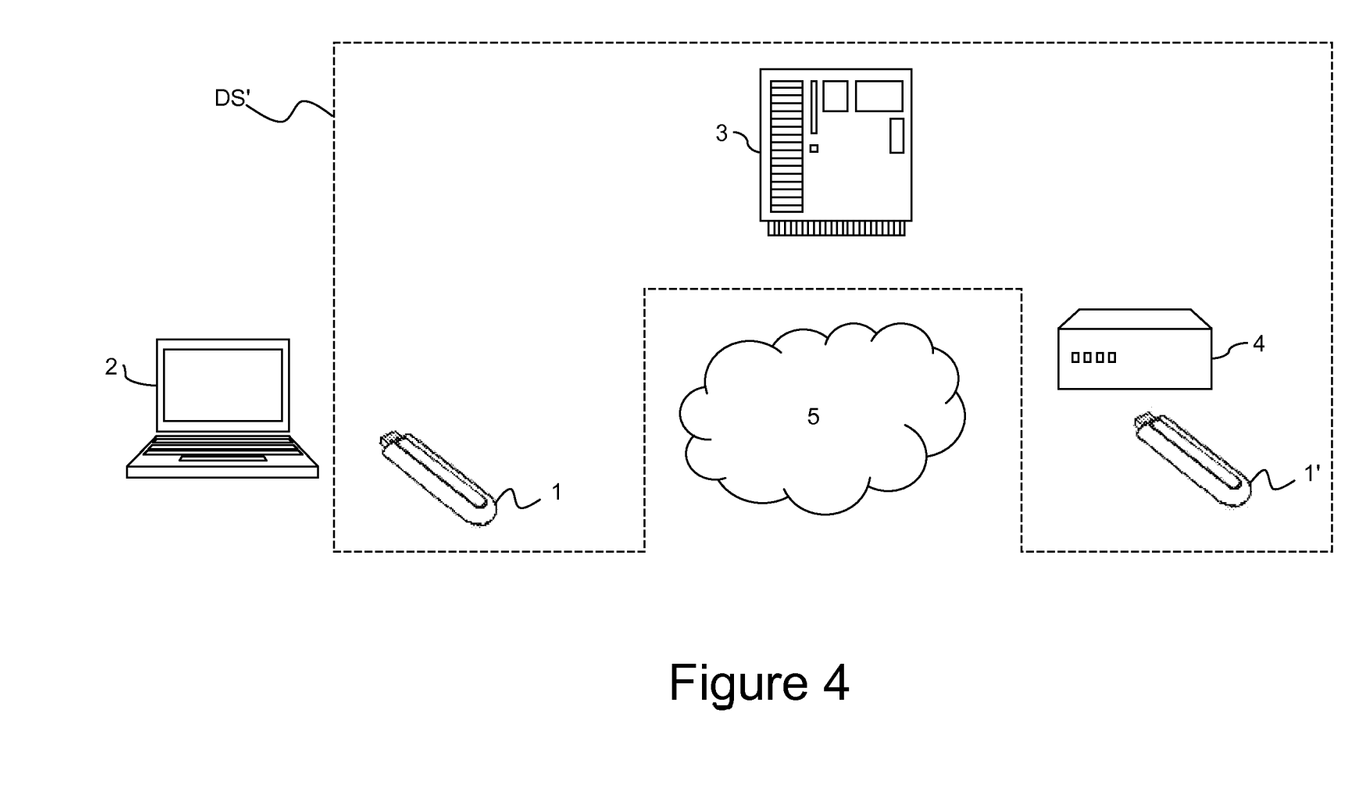
FIG. 4 schematically shows a distributed system for storing digital data, according to a further embodiment of the present invention.

FIG. 4 schematically shows a distributed system DS' for storing digital data, according to a further embodiment of the present invention.

The distributed system DS' comprises a portable storage device 1, a further portable storage device 1', a dispatching server 3, a storage server 4, and a number of further storage servers (not shown in FIG. 4). The distributed system DS' is suitable for cooperating with a terminal 2 and a communication network 5.

The structure of the portable storage device 1 is similar to the structure shown in FIG. 2. A detailed description therefore will not be repeated. On the other hand, preferably, the further portable storage device 1' may include an interface (such as e.g. an USB interface) allowing the further portable storage device 1' to be connected to the storage server 4, a controller and a memory.

The storage server 4 is preferably provided with an interface (not shown in FIG. 4) suitable for allowing the further portable storage device 1' to be connected to the storage server 4. The storage server 4 preferably is an electronic device including a memory suitable for storing digital data, such as for instance: a PC, a mobile phone, a set-top box, etc. For instance, according to an exemplary scenario, the storage server 4 may be the user PC. As mentioned above, the storage server 4 has a remote access function allowing it to interact with the dispatching server 3 and with the portable storage device 1 for being remotely accessed. Preferably, the remote access function allows the user to configure the storage server 4 in order to make its content fully or partially accessible by the portable storage device 1. The remote access function may be for instance downloaded from a web site and installed at the storage server 4, that activates it when needed. Alternatively, the remote access function may be stored at the further portable storage device 1'. The storage server 4 may access it and activate it each time the further portable storage device 1' is connected to it. Alternatively, the storage server 4 may load the remote access function from the further portable storage device 1' to a local memory when the further portable storage device 1' is connected to the storage device 4 for the first time, and may then activate it when needed.

The dispatching server 3 is provided with a communication module (not shown in FIG. 1) allowing it to be connected to the portable storage device 1 and to the further portable storage device 1' through the communication network 5.

The terminal 2 is preferably provided with an interface (not shown in FIG. 4) suitable for allowing the portable storage device 1 to be connected to the terminal 2. For instance, the terminal 2 may be a PC, a mobile phone, a digital photo-frame, a set-top box, a car radio, etc.

The communication network 5 may include one or more circuit-switched networks (such as e.g. SDH networks or Sonet networks) and/or one or more packet-switched networks (such as e.g. Ethernet network, Internet network, ATM networks, etc.). The communication network 5 may be a wired network, a wireless network, or a mix of wired and wireless networks.

Preferably, the portable storage device 1 and the further portable storage device 1' store a same identifier. The user may buy a kit comprising both the portable storage device 1 and the further portable storage device 1', and then plug the first one in the terminal 2, and the second one in the storage server 4, as shown in FIG. 4. When plugged in the storage server 4, the further portable storage device 1' transmits to the dispatching server 3 accessibility information preferably comprising its identifier and the address towards which a connection must be established for accessing it (e.g. an IP address). Upon reception of the accessibility information, the dispatching server 3 preferably stores them in a database cooperating with it. On the other hand, when the portable storage device 1 is plugged in the terminal 2, it preferably sends identification information to the dispatching server 3. The identification information preferably comprises the identifier of the portable storage device 1 (that, as mentioned above, is the same as the identifier of the further portable storage device 1') and its address (e.g. the MAC address of its wireless module, and/or its network address). Upon reception of the identification information, the dispatching server 3 preferably uses such identification information for determining whether the storage server 4 is accessible. In particular, the dispatching server 3 uses the identifier comprised in the identification information for looking up its database and determining whether it stores accessibility information comprising the same identifier. In the affirmative, the dispatching server 3 and the portable storage device 1 operate according to the above described steps 306 to 308. In the negative, the dispatching server 3 and the portable storage device 1 operate according to the above described steps 304 and 305.

Although the above mentioned example shown in FIG. 4 refers to a kit comprising only one further portable storage device 1', according to other examples the kit may include more than one further portable storage device 1', each suitable for being plugged in a respective storage server at the choice of the user. For instance, in case of two further portable storage devices 1', the user may plug each of them in a respective storage server. When a further portable storage device 1' is connected to the respective storage server, the storage server preferably sends to the dispatching server 3 accessibility information comprising its identifier (which, preferably, is equal to the identifier of the portable storage device 1 for all the further portable storage devices 1' included in the same kit) and its address. The user, through the portable storage device 1 plugged in the terminal 2, may then access the content of any storage server in which one of the further portable storage devices 1' is plugged.

Therefore, the distributed system described above has a number of advantages. First of all, it advantageously allows a user whose portable storage device is lost or stolen to prevent unauthorized parties from accessing her/his storage server(s) through the lost or stolen portable storage device, in a very simple and reliable way. Besides, advantageously, it allows the user to select the storage server(s) to be accessed, and to change dynamically such a selection while she/he is using the portable storage device. Moreover, it allows implementation of communication services allowing the user to purchase premium contents, the access to premium contents being mediated by the dispatching server 3 according to billing information stored in a billing system.

The invention claimed is:

1. A distributed system for storing digital data, said distributed system comprising:
    a portable storage device configured to be connected to a terminal,
    at least one storage server, and
    a dispatching server configured to communicate with said portable storage device and with said at least one storage server, wherein:
        said dispatching server is further configured to receive and store accessibility information indicating that said at least one storage server is accessible by said portable storage device, said accessibility information comprising an address for which a connection is activated when allowing said portable storage device to access said at least one storage server;
        said portable storage device is further configured to, when connected to said terminal, send identification information to said dispatching server, said identification information comprising an identifier of said portable storage device to allow said dispatching server to uniquely identify said portable storage device;
        said dispatching server is further configured to:
            upon reception of said identification information, determine whether said at least one storage server is accessible by said portable storage device by, using said identification information, determining whether said dispatching server stores accessibility information indicating that said at least one storage server is accessible by said portable storage device; and
            in response to determining that said at least one storage server is accessible by said portable storage device, retrieve and send said accessibility information to said portable storage device by using said identification information; and
        said portable storage device is further configured to, upon reception of said accessibility information from said dispatching server, establish a connection with said at least one storage server using said address from the accessibility information, wherein said connection allows said terminal to access contents of said at least one storage server.

2. The distributed system according to claim 1, wherein said portable storage device comprises:
    an interface configured to allow said portable storage device to be connected to said terminal;
    a memory configured to locally store digital data;
    a wireless module configured to allow said portable storage device to be connected to said at least one storage server; and
    a controller including
        a processor; and
        storage that stores one or more software programs that, when executed by said processor, cause said portable storage device to
            acquire information from at least one of said interface, said memory and said wireless module, and
            control their operation according to said accessibility information received from said dispatching server.

3. The distributed system according to claim 2, wherein said portable storage device is configured to send said identification information to said dispatching server by a further connection established through said wireless module.

4. The distributed system according to claim 1, wherein said terminal accesses contents of said at least one storage server for at least one of sending and receiving said digital data.

5. The distributed system according to claim 2, wherein said portable storage device further comprises an input/output module configured to allow a user to acquire at least part of said accessibility information from said portable storage device and to impart commands to said portable storage device.

6. The distributed system according to claim 2, wherein said one or more software programs, when executed by said processor, further cause said portable storage device to allow access to digital data stored in said memory and digital data stored at said at least one storage server as a file system.

7. The distributed system according to claim 2, wherein said one or more software programs, when executed by said processor, further cause said portable storage device to, in a case that said accessibility information indicates that more than one storage server is accessible by said portable storage device, automatically connect to a default storage server of said more than one storage server.

8. The distributed system according to claim 2, wherein said one or more software programs, when executed by said processor, further cause said portable storage device to, in a case that more than one storage server is accessible by said portable storage device:
    present a user with a list of said more than one storage server;
    receive from said user a command indicating a selected storage server among said more than one storage server; and
    connect to said selected storage server.

9. The distributed system according to claim 2, wherein said one or more software programs, when executed by said processor, further cause said portable storage device to, after establishing said connection with said at least one storage server:
    receive from a user a command to access a second storage server of said at least one storage server;
    activate a new connection towards said second storage server; and perform a reboot of said portable storage device, to present said user with digital data stored at said second storage server.

10. The distributed system according to claim 9, wherein said one or more software programs, when executed by said processor, further cause said portable storage device to deactivate said connection towards said at least one storage server, before activating said new connection towards said second storage server.

11. The distributed system according to claim 1, wherein said dispatching server is configured to receive said accessibility information from said at least one storage server.

12. The distributed system according to claim 1, wherein said dispatching server is configured to receive and store updates of said accessibility information, and to send said updates to said portable storage device.

13. The distributed system according to claim 1, wherein said at least one storage server is configured to execute a remote access function configured to interact with said dispatching server, said remote access function allowing at least part of digital data stored at said storage server to be accessed by said portable storage device.

14. The distributed system according to claim 2 further comprising a further portable storage device coupled to said portable storage device, said further portable storage device comprising:
 a further interface configured to allow said further portable storage device to be connected to said storage server; and
 a further memory configured to locally store identification information matching said identification information sent by said portable storage device to said dispatching server.

15. The distributed system according to claim 2 further comprising a billing system, said dispatching server being configured to, upon reception of said identification information from said portable storage device, cooperate with said billing system for determining whether a user is allowed to access said at least one storage server by said portable storage device.

16. A method for presenting a user with digital data stored in at least one storage server by a portable storage device configured to be connected to a terminal, said method comprising:
 providing, at a dispatching server configured to communicate with said portable storage device and said at least one storage server, accessibility information indicating that said at least one storage server is accessible by said portable storage device, said accessibility information comprising an address for which a connection is activated when allowing said portable storage device to access said at least one storage server;
 connecting said portable storage device to said terminal and sending identification information of said portable storage device from said portable storage device to said dispatching server, said identification information comprising an identifier of said portable storage device to allow said dispatching server to uniquely identify said portable storage device;
 at said dispatching server, determining whether said at least one storage server is accessible by said portable storage device by, using said identification information determining whether said dispatching server stores accessibility information indicating that said at least one storage server is accessible by said portable storage device;
 at said dispatching server, in response to determining that said at least one storage server is accessible by said portable storage device, retrieving and sending said accessibility information to said portable storage device by using said identification information; and
 at said portable storage device, establishing a connection with said at least one storage server using said address from accessibility information, wherein said connection allows said terminal to access contents of said at least one storage server through said terminal.

17. The distributed system according to claim 1, wherein said accessibility information comprises an identifier of said at least one storage server and an address for accessing said at least one storage server.

* * * * *